United States Patent [19]
Owens et al.

[11] 4,286,302
[45] Aug. 25, 1981

[54] ELECTRICAL CAPACITOR PROTECTIVE ARRANGEMENT

[75] Inventors: Michael Owens, Hendersonville; Roy W. Waldroup, Fletcher; Warren Halper, Hendersonville, all of N.C.

[73] Assignee: General Electric Company, Schenectady, N.Y.

[21] Appl. No.: 42,585

[22] Filed: May 25, 1979

[51] Int. Cl.³ .............................................. H02H 7/16
[52] U.S. Cl. ..................................... 361/15; 361/272; 361/275; 174/52 PE
[58] Field of Search ...................... 361/15, 16, 17, 272, 361/275; 174/52 PE, 52 S, 52 H

[56] References Cited

U.S. PATENT DOCUMENTS

| | | | |
|---|---|---|---|
| 2,904,618 | 9/1959 | Robinson et al. | 361/272 X |
| 3,377,510 | 4/1968 | Rayno | 361/15 |
| 3,909,504 | 9/1975 | Browne | 174/52 PE |
| 3,909,683 | 9/1975 | Kysely | 361/15 X |

Primary Examiner—Patrick R. Salce
Attorney, Agent, or Firm—Lawrence R. Kempton; Philip L. Schlamp

[57] ABSTRACT

Electrical capacitor has guard placed over its external terminals to provide space for displacement of the terminals in the operation of the internal pressure sensitive interrupter device when the capacitor is embedded by encapsulating material in an electrical ballast container.

5 Claims, 5 Drawing Figures

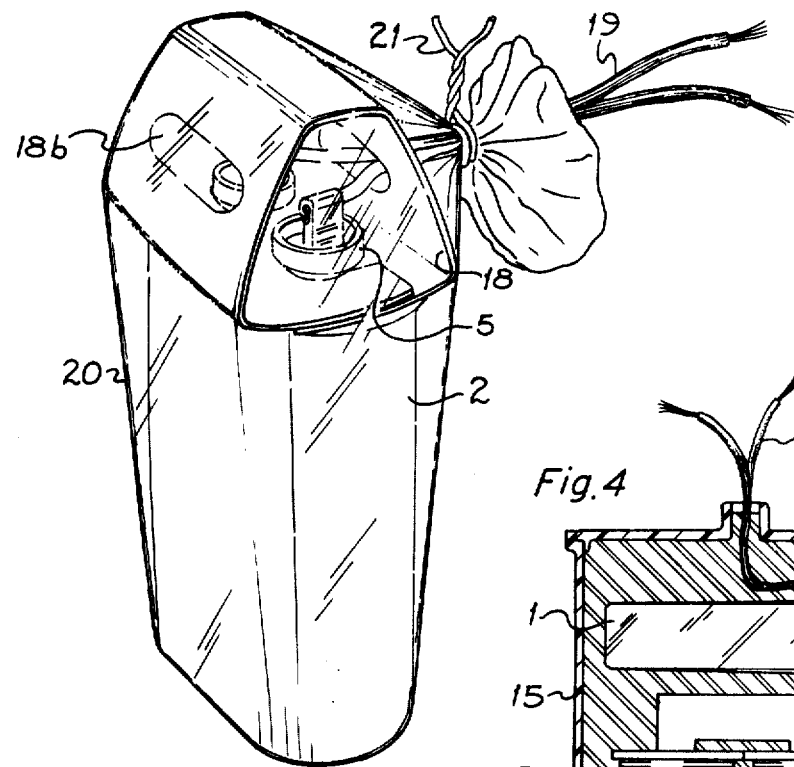
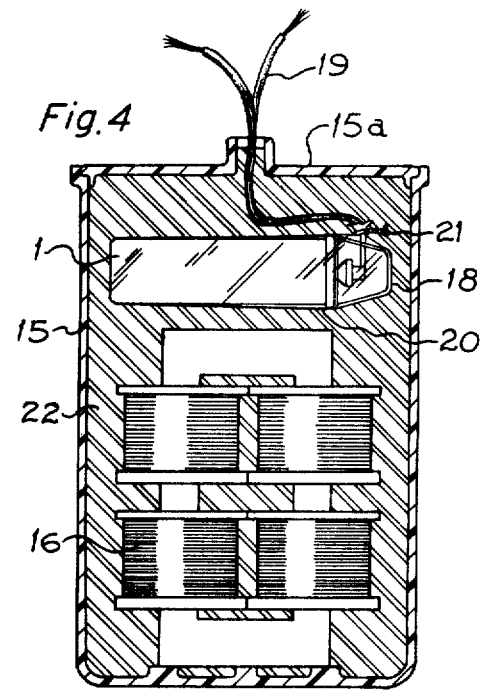
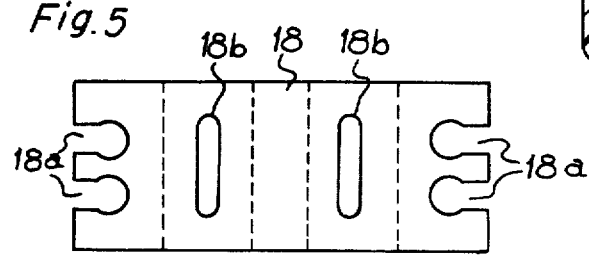

ELECTRICAL CAPACITOR PROTECTIVE ARRANGEMENT

The present invention relates to electrical capacitors, especially of the type designed for use in electrical ballasts for gaseous discharge lamps, and more particularly concerns a protective arrangement for electrical capacitors of this type.

In conventional lamp ballast constructions, the metal-encased ballast capacitor is usually held in place in the ballast container by such potting or encapsulating compounds as tar, asphalt or epoxy resin. Failure of the capacitor at end-of-life or at other times may be accompanied by excessive internal pressure which eventually ruptures the metal capacitor casing, allowing leakage of the contained dielectric liquid. In a known type of capacitor, an internal pressure-sensitive interrupter device is incorporated which operates upon initial bulging of the capacitor casing to automatically interrupt electrical operation of the capacitor before rupture of the casing can result. When such capacitors are encapsulated as mentioned above, displacement of the terminal region of the capacitor in the event of the described failure conditions may be unduly restricted by the encapsulating material, thus preventing effective operation of the pressure sensitive interrupter.

It is an object of the invention to provide a protective arrangement for capacitors of the above type which avoids the above-mentioned difficulty.

It is a specific object of the invention to provide a capacitor protective arrangement of the above type which provides for adequate displacement of the terminal region of the encapsulated capacitor to enable operation of the pressure sensitive interrupter.

Another object of the invention is to provide a capacitor protective arrangement of the above type which is simple in construction and is readily and economically applied to conventional ballast apparatus.

It is a further object of the invention to provide lamp ballast apparatus incorporating a protected capacitor of the above type.

Other objects and advantages will become apparent from the following description and the appended claims.

With the above objects in view, the present invention in one of its aspects relates to capacitor protective apparatus comprising, in combination, an electrical capacitor of a type adapted to be embedded in encapsulating material in a container, the capacitor comprising a sealed casing containing a capacitor section and having external terminal means mounted on a portion of the casing and projecting outwardly therefrom, the capacitor during operation being subject to failure conditions causing outward displacement of the casing portion and the terminal means thereon, interrupter means within the casing for automatically breaking the electrical connection between the capacitor section and the terminal means upon the outward displacement of the casing portion and the terminal means, and protective means on the capacitor for maintaining a vacant space outwardly adjacent the terminal means when the capacitor is encapsulated in a container, so that the casing portion with the terminal means mounted thereon can be outwardly displaced without restriction by the encapsulating material upon the occurrence of the failure conditions, thereby providing for operation of the interrupter means prior to rupture of the casing.

The invention will be better understood from the following description taken in conjunction with the accompanying drawings, in which:

FIG. 3 is a perspective view of a capacitor protective capacitor arrangement in accordance with an embodiment of the invention;

FIG. 4 is a view, partly in section, of an encapsulated ballast apparatus in which the capacitor protective arrangement of FIG. 3 is incorporated; and FIG. 5 is a plan view of the flat strip from which the protective guard for the capacitor terminals is formed.

Figure 1:
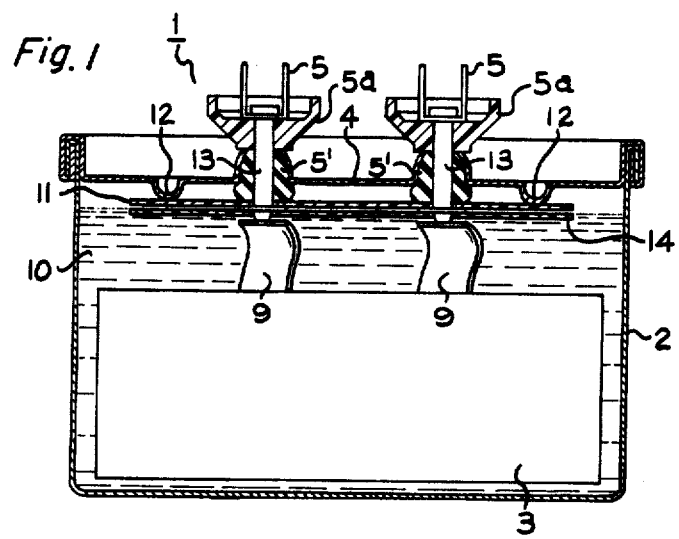
FIG. 1 is an elevational view partly in section, of a capacitor of a type to which the protective arrangement of the present invention is applicable, showing electrical connection between the external terminals and the interior capacitor section in the normal operating condition of the capacitor.

Referring now to the drawings, and particularly to FIG. 1, there is shown an electrical capacitor 1 of a type suitable for use in discharge lamp ballast circuits, comprising a sealed casing 2, usually of metal, containing a wound capacitor roll section 3 of conventional construction having conductive leads or tap straps 9 projecting therefrom and being immersed in a dielectric liquid 10. Casing 2 is sealed at its open top by cover 4 which has external terminals 5 mounted thereon by bushings 5' and has spaced projections 12 extending downwardly therefrom. Conductive terminal studs 13 passing through each terminal bushing 5' connect terminals 5 to the respective tap straps 9. The capacitor has an internal circuit-breaker or interrupter device comprising insulating sheet 11 arranged below cover 4 on terminal studs 13 and stiff insulating board 14 mounted on studs 13 between sheet 11 and the end of tap straps 9, board 14 having apertures through which the lower ends of studs 13 pass. Details of this structure of the interrupter device and the operation thereof are disclosed in U.S. Pat. No. 4,106,068—Flanagan, issued Aug. 8, 1978 and assigned to the same assignee as the present invention, and the disclosure thereof is accordingly incorporated herein by reference.

Figure 2:
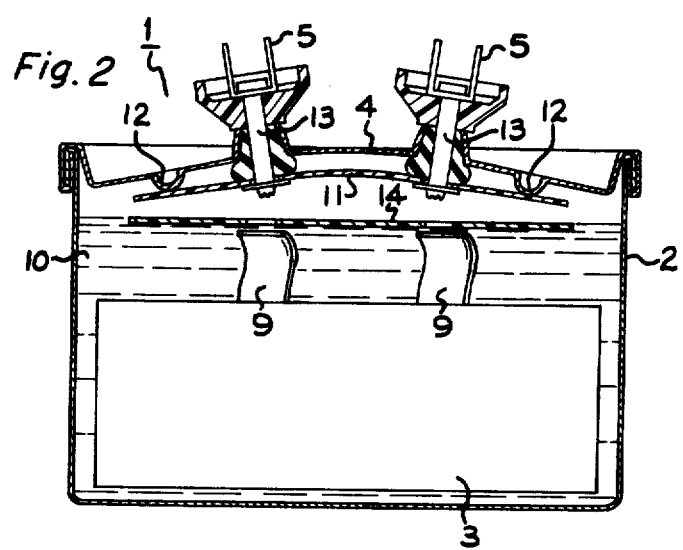
FIG. 2 is a similar view of the FIG. 1 capacitor showing disconnection of the capacitor terminals from the interior capacitor section due to outward displacement of the terminals resulting from excess pressure in the interior of the capacitor.

In the operation of the interrupter device as there disclosed, upon the occurrence of excess pressure conditions within capacitor casing 2, the pressure build-up causes cover 4 to begin bulging outwardly. As a result, as seen in FIG. 2, sheet member 11 is pulled or flexed upwardly by terminals 5 while the ends of sheet 11 are being restrained by cover projections 12. Such outward bulging of cover 4 ultimately causes a rupture in the weld connection between tap straps 9 and terminal studs 13, thus interrupting the electrical operation of the capacitor.

When used in an electrical ballast, such a capacitor is typically placed in a ballast container 15 (see FIG. 4) together with a ballast transformer 16, and the two ballast components are encapsulated or potted therein by such compounds as tar, asphalt, polyester or epoxy resin, usually with a suitable filler therein, the encapsulating material usually being poured in liquid form into the ballast container around the ballast components and allowed to harden.

In accordance with the present invention, means are provided on capacitor 1 for ensuring that a vacant space is maintained adjacent the cover and terminal region of the capacitor during and after the encapsulating process, so that if cover 4 and associated terminals 5 bulge outwardly due to over-pressure within the capacitor, the cover and terminals will have sufficient space into which to move to enable the interrupter device to operate as described above for interrupting the operation of the capacitor before a rupture occurs in casing 2, with consequent leakage of the dielectric liquid therefrom.

For this purpose, there is provided in accordance with an embodiment of the invention, as shown in FIG. 3, a guard member 18 formed of a stiff, yet pliable sheet of paperboard or the like folded to form a four-sided tent-like structure or shelter open at opposite ends. Sheet 18, which is preferably electrically insulating, may be composed of various other materials, such as plastic, fiberboard, or even metal if electrical insulation is not required. Basically, the sheet material should be sufficiently stiff to avoid collapse of the guard member when the capacitor is being encapsulated, while being pliable enough to not interfere with the operation of the pressure sensitive interrupter.

As seen in FIG. 5, the paperboard sheet is provided with a pair of key holes 18a at opposite ends for insertion under the capacitor terminal cups 5a. Slots 18b are cut in the paper sheet to allow passage of the external leads 19 connected to the capacitor terminals. To form the guard member, the paperboard sheet is folded along the four interrupted lines shown in FIG. 5, and the end portions are fitted in overlapping relation under terminal cups 5a, forming a trapezoidal tent structure as shown in FIG. 3. External leads 19 are inserted through slot 18b and connected to the capacitor terminals.

In accordance with the invention, the described assembly of capacitor 1 with attached guard member 18 is placed within a heat-resistant bag 20 made of a suitable plastic material such as nylon, and the bag is closed with a wire tie wrap 21 or the like to seal the bag 20 around wire leads 19. Other means of sealing the bag around the leads such as heat sealing, rubber grommets, shrink tubing or the like may also be used to seal the bag around the wire leads.

In this condition, the enclosed capacitor is then electrically connected to the ballast transformer 16 (see FIG. 4), both units are placed in a container 15, and the container is filled with encapsulating compound 22. By virtue of the described arrangement, the liquid fill material is prevented from entering bag 20 during the encapsulating process. As seen in FIG. 4, bag 20 is supported by guard 18 in the region of the capacitor terminals, and the filling compound is thus prevented from collapsing the bag and entering the space adjacent to the terminals. As the filling compound hardens, a cavity remains in that area into which the capacitor cover and terminals can be displaced to enable effective operation of the pressure sensitive interrupter device as described previously.

To complete the assembly, the open end of container 15 is covered by end cap 15a with leads 19 extending through the aperture therein.

While the trapezoidal shape of the guard member 18 shown in FIG. 3 has been found to provide particularly satisfactory results, other shapes may be employed within the scope of the invention, provided that the shape and material used afford the requisite stiffness of the guard member.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. Capacitor protective apparatus comprising, in combination, an electrical capacitor of a type adapted to be embedded in encapsulating material in a container, said capacitor comprising a sealed casing containing a capacitor section and having external terminal means electrically connected to said capacitor section mounted on a portion of said casing and projecting outwardly therefrom, said capacitor during operation being subject to failure conditions causing outward displacement of said casing portion and said terminal means thereon, interrupter means associated with said casing portion for automatically breaking the electrical connection between said capacitor section and said terminal means upon said outward displacement of said casing portion and said terminal means, and protective means on said capacitor for maintaining a vacant space outwardly adjacent said terminal means when said capacitor is encapsulated in a container, so that said casing portion with said terminal means mounted thereon can be outwardly displaced without restriction by the encapsulating material upon the occurrence of said failure conditions, thereby providing for operation of said interrupter means prior to rupture of said casing, said protective means comprising a guard member arranged on said casing and defining said vacant space adjacent said terminal means, said guard member comprising an elongated tent-like structure open at opposite ends and formed of a folded strip of stiff sheet member.

2. Apparatus as defined in claim 1, said guard member having a substantially trapezoidal shape.

3. Apparatus as defined in claim 1, said sheet member composed of electrically insulating material.

4. Apparatus as defined in claim 1, said strip having recesses formed in opposite end portions, said guard member being mounted on said terminal means with its recessed end portions in overlapping relation engaging said terminal means.

5. Apparatus as defined in claim 4, said strip formed with an opening intermediate its ends for passage of electrical leads therethrough.

* * * * *